(12) United States Patent
Ma

(10) Patent No.: US 11,079,020 B2
(45) Date of Patent: Aug. 3, 2021

(54) SEAL RING AND SEAL STRUCTURE

(71) Applicant: ILLINOIS TOOL WORKS INC., Glenview, IL (US)

(72) Inventor: Yue Ma, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 357 days.

(21) Appl. No.: 16/208,723

(22) Filed: Dec. 4, 2018

(65) Prior Publication Data

US 2019/0186633 A1   Jun. 20, 2019

(30) Foreign Application Priority Data

Dec. 18, 2017 (CN) .......................... 201711368629.1
Dec. 18, 2017 (CN) .......................... 201721774327.X

(51) Int. Cl.

| *F16J 15/324* | (2016.01) |
| *F16J 15/3232* | (2016.01) |
| *F16J 15/3284* | (2016.01) |
| *F16J 15/3216* | (2016.01) |
| *F16J 15/3204* | (2016.01) |
| *F16J 15/322* | (2016.01) |

(Continued)

(52) U.S. Cl.
CPC ......... *F16J 15/3232* (2013.01); *F16J 15/002* (2013.01); *F16J 15/322* (2013.01); *F16J 15/324* (2013.01); *F16J 15/3204* (2013.01); *F16J 15/328* (2013.01); *F16J 15/3216* (2013.01); *F16J 15/3236* (2013.01); *F16J 15/3268* (2013.01); *F16J 15/3284* (2013.01); *F01P 7/16* (2013.01)

(58) Field of Classification Search
CPC .... F16J 15/3232; F16J 15/002; F16J 15/3204; F16J 15/3216; F16J 15/322; F16J 15/3236; F16J 15/324; F16J 15/3268; F16J 15/328; F16J 15/3284; F01P 7/16
See application file for complete search history.

(56) References Cited

U.S. PATENT DOCUMENTS 3,447,848 A * 6/1969 Pitner .................. F16C 33/605
                                                        384/484
3,479,100 A * 11/1969 Pitner ................. F16C 33/7809
                                                        384/484

(Continued)

FOREIGN PATENT DOCUMENTS

EP        2963319 A1     1/2016
WO    WO-2009143972 A1 * 12/2009  ........... F16J 15/3212

OTHER PUBLICATIONS

Communication pursuant to Article 94(3) EPC ssued for European Patent Application No. 18211219.3, dated Apr. 8, 2020.

(Continued)

*Primary Examiner* — Vishal A Patel
(74) *Attorney, Agent, or Firm* — Quarles & Brady LLP

(57) ABSTRACT

A seal ring is provided for sealing a rotating shaft. The seal ring has an outer wall and an inner wall. The outer wall includes one or more external ribs, and the external ribs are disposed along a circumferential direction of the outer wall. The inner wall includes one or more seal contact parts extending inwards from the inner wall, and the seal contact parts are disposed along a circumferential direction of the inner wall. The seal ring is made of an elastic material.

19 Claims, 9 Drawing Sheets

(51) Int. Cl.
*F16J 15/3236* (2016.01)
*F16J 15/00* (2006.01)
*F16J 15/3268* (2016.01)
*F16J 15/328* (2016.01)
*F01P 7/16* (2006.01)

(56) References Cited

U.S. PATENT DOCUMENTS

| | | | | |
|---|---|---|---|---|
| 3,612,551 | A * | 10/1971 | Grabill, Jr. | F16J 15/3236 |
| | | | | 277/566 |
| 4,440,401 | A * | 4/1984 | Olschewski | F16C 21/005 |
| | | | | 277/353 |
| 6,168,208 | B1 * | 1/2001 | Thaler | E04D 13/0409 |
| | | | | 277/607 |
| 6,203,022 | B1 * | 3/2001 | Struschka | B60T 11/16 |
| | | | | 277/437 |
| 6,244,600 | B1 * | 6/2001 | Leturcq | F16J 15/008 |
| | | | | 277/353 |
| 6,862,884 | B2 * | 3/2005 | Cohen | B60T 11/16 |
| | | | | 60/562 |
| 8,641,417 | B2 * | 2/2014 | Kumar | A61C 1/057 |
| | | | | 433/126 |
| 9,388,913 | B2 | 7/2016 | Schlick et al. | |
| 2002/0100363 | A1 * | 8/2002 | Vatterott | F15B 15/1452 |
| | | | | 92/85 B |
| 2008/0203672 | A1 * | 8/2008 | Smith | F16J 15/028 |
| | | | | 277/356 |
| 2014/0216872 | A1 * | 8/2014 | Kani | F16J 15/3204 |
| | | | | 188/322.16 |
| 2016/0305546 | A1 * | 10/2016 | Mueller-Niehuus | |
| | | | | F16J 15/3232 |

OTHER PUBLICATIONS

European Search Report issued for European Patent Application No. 18211219.3, dated May 16, 2019.

* cited by examiner

SEAL RING AND SEAL STRUCTURE

CROSS-REFERENCE TO RELATED APPLICATIONS

The present application is based on, claims priority to, and incorporates in its entirety Chinese patent application number 201711368629.1, filed on Dec. 18, 2017, and Chinese patent application number 201721774327.X, filed on Dec. 18, 2017.

FIELD OF THE INVENTION

The present application relates to a seal ring and seal structure, and in particular to a seal ring and seal structure for a rotating shaft. The seal ring and the seal structure in the application may be used in the field of general machinery, and in particular in the field of thermostats of internal combustion engines.

BACKGROUND

Thermostats for internal combustion engines generally comprise a housing and a hollow valve body disposed within the housing. The housing is equipped with at least three ports, namely, an internal combustion engine port for communicating with an internal combustion engine cooling system, a radiator port for communicating with a radiator, and a bypass port for communicating with a bypass. The hollow valve body is driven by a driving device to rotate around a rotating shaft in the housing. The hollow valve body is provided with at least one hole which can selectively communicate with one or more coolant connection ports of the housing by the rotation of the hollow valve body so that the coolant can be selectively guided by the thermostat from the internal combustion engine, via the bypass or radiator back to the internal combustion engine. Since the rotating shaft of the hollow valve body is connected with the driving device and the rotating shaft of the hollow valve body is in the coolant environment, it is necessary to provide a shaft seal between the rotating shaft of the hollow valve body and the driving device to prevent the coolant from entering the driving device along the rotating shaft and thus to protect the driving device against short-circuit, corrosion, wear or the like due to erosion by the coolant.

A traditional seal ring for rotating shafts generally uses a skeleton oil seal which includes a metal skeleton and rubber. Specifically, the skeleton oil seal has a layer of rubber externally wrapped around the metal skeleton. The metal skeleton provides tension to secure the seal ring at a sealing position. However, due to use of the structure as combined, the traditional seal ring has higher material costs and manufacturing costs, and the defective rate of finished products is also higher. Besides, the configuration of the metal skeleton requires very high installation accuracy during assembly. This is because, during assembly, since the metal skeleton provides the tension for fixing to the housing, the metal skeleton must be already positioned at the installation position before installing the rotating shaft, and then the rotating shaft is inserted therein. However, the skeleton oil seal which has already been positioned at the installation position requires that the rotating shaft must be accurately centered, otherwise the rubber contacting the rotating shaft would be stressed unevenly in various positions during installation of the rotating shaft, which may damage the seal ring and reduce the sealing effect and service life of the seal ring. Therefore, there is a need for a new seal ring and seal structure which can not only optimize the assembly sequence for miniaturization and mass automatic assembly with reduced costs and improved yield rates, but also improve the sealing effect and service life of the seal ring.

SUMMARY

Exemplary embodiments of the present application may solve at least some of the above problems.

According to a first aspect of the application, the application provides a seal ring for sealing a rotating shaft, wherein the seal ring has an outer wall and an inner wall; the outer wall includes one or more external ribs, and the external ribs are disposed along a circumferential direction of the outer wall; the inner wall includes one or more seal contact parts extending inwards from the inner wall, and the seal contact parts are disposed along a circumferential direction of the inner wall; and the seal ring is made of an elastic material.

According to the seal ring described above, two of the seal contact parts are provided, wherein one of the seal contact parts extends obliquely upwards from the inner wall, and the other of the seal contact parts extends obliquely downwards from the inner wall.

According to the seal ring described above, an axial section of the seal ring is a K-shaped structure, and a recessed part is provided between the two seal contact parts, the recessed part being configured to receive a lubricant.

According to the seal ring described above, one of the seal contact parts is provided, wherein the seal contact part extends obliquely downwards from the inner wall so that an axial section of the seal ring is a Y-shaped structure; and a hook component is provided at an upper end of the seal ring, the hook component being disposed along a circumferential direction of the inner wall for restricting the seal ring from sliding downwards along an axial direction.

According to the seal ring described above, the elastic material is ethylene propylene diene rubber.

According to the seal ring described above, the seal ring is injection molded.

According to a second aspect of the application, the application provides a seal structure, and the seal structure comprises: a seal ring having an outer wall and an inner wall; the outer wall including one or more external ribs, the external ribs being disposed along a circumferential direction of the outer wall; the inner wall including one or more seal contact parts extending inwards from the inner wall, the seal contact parts being disposed along a circumferential direction of the inner wall; wherein the seal ring is made of an elastic material; a valve body, a downwardly recessed cavity being provided at a top portion of the valve body; and a rotating shaft, the rotating shaft passing through the cavity, the seal ring being disposed at the rotating shaft in the cavity; wherein an adjustment contact part is provided at a bottom portion of the cavity of the valve body, and an adjustment space is provided between the adjustment contact part and a lower portion of the seal ring.

According to the seal structure described above, the adjustment contact part protrudes from the bottom portion of the cavity of the valve body.

According to a third aspect of the application, the application provides a seal structure, and the seal structure comprises: a seal ring having an outer wall and an inner wall; the outer wall including one or more external ribs, the external ribs being disposed along a circumferential direction of the outer wall; the inner wall including one or more seal contact parts extending inwards from the inner wall, the seal contact parts being disposed along a circumferential direction of the inner wall; wherein the seal ring is made of an elastic material; wherein one of the seal contact parts is provided, and the seal contact part extends obliquely downwards from the inner wall so that an axial section of the seal ring is a Y-shaped structure; and a hook component is provided at an upper end of the seal ring, the hook component being disposed along a circumferential direction of the inner wall; a rotating shaft on which the seal ring is disposed; and a bearing disposed on the rotating shaft, a protrusion being provided at a lower end of the bearing, the protrusion being configured to be engaged with the hook component to restrict the seal ring from sliding downwards along an axial direction.

According to the two seal structures described above, a passage is provided between the seal ring in the seal structure according to the second aspect and the seal ring in the seal structure according to the third aspect.

The seal ring and seal structure according to the application can not only optimize the assembly sequence for miniaturization and mass automatic assembly with reduced costs and improved yield rates, but also improve the sealing effect and service life of the seal ring.

Other features, advantages and embodiments of the present application may be set forth or become apparent by considering the following detailed description, drawings and claims. In addition, it should be understood that both the above summary of the application and the following detailed description are intended to be exemplary and to provide further explanation rather than limiting the scope of the claimed application. However, the detailed description and specific examples only indicate the preferred embodiments of the present application. Various changes and modifications within the spirit and scope of the application will become apparent to those skilled in the art from the detailed description.

BRIEF DESCRIPTION OF THE DRAWINGS

These and other features and advantages of the present application may be better understood by reading the following detailed description with reference to the accompanying drawings, in which like reference numerals refer to like parts throughout the drawings, and in which.

DETAILED DESCRIPTION

Figure 1:
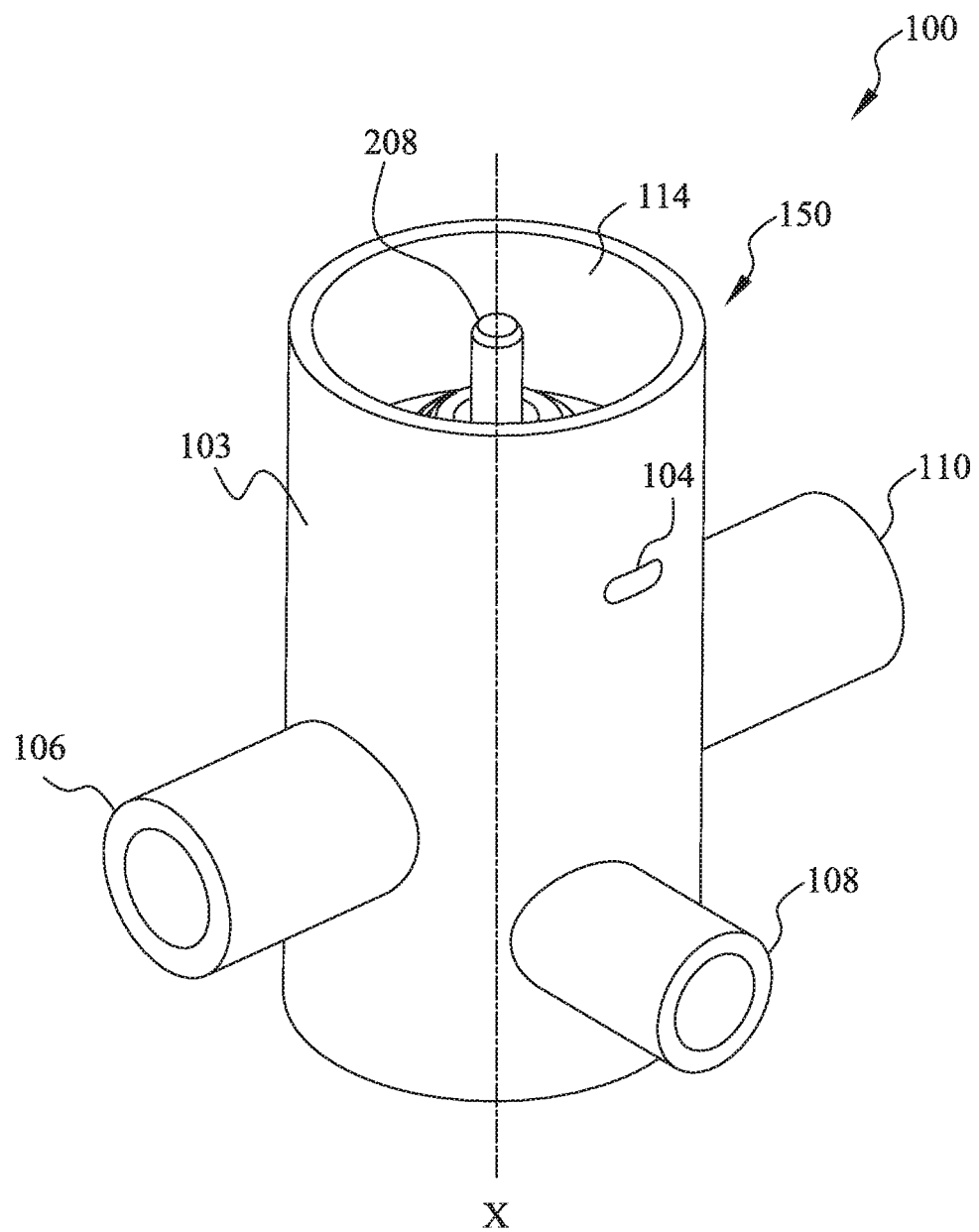
FIG. 1 is a stereogram of a vehicle thermostat according to one embodiment of the present application.

Various embodiments of the present application will now be described with reference to the accompanying drawings that form a part of the specification. It should be understood that although directional terms such as "front," "back," "up," "down," "left," "right" or other directional or orientational descriptions are used in the application to describe various exemplary structural parts and elements of the application, these terms are used herein only for convenience of description and are determined based on the exemplary orientations shown in the drawings. Since the embodiments disclosed herein may be arranged in different directions, these directional terms are for illustration only and should not be taken as limitations. In the following drawings, the same parts use the same reference numerals, and similar parts use similar reference numerals.

The seal ring and seal structure of the application can be used in the field of general machinery. In order to better embody the practical application of the seal ring and seal structure of the present application, the following description will take the vehicle thermostat as an example.

Figure 2A:
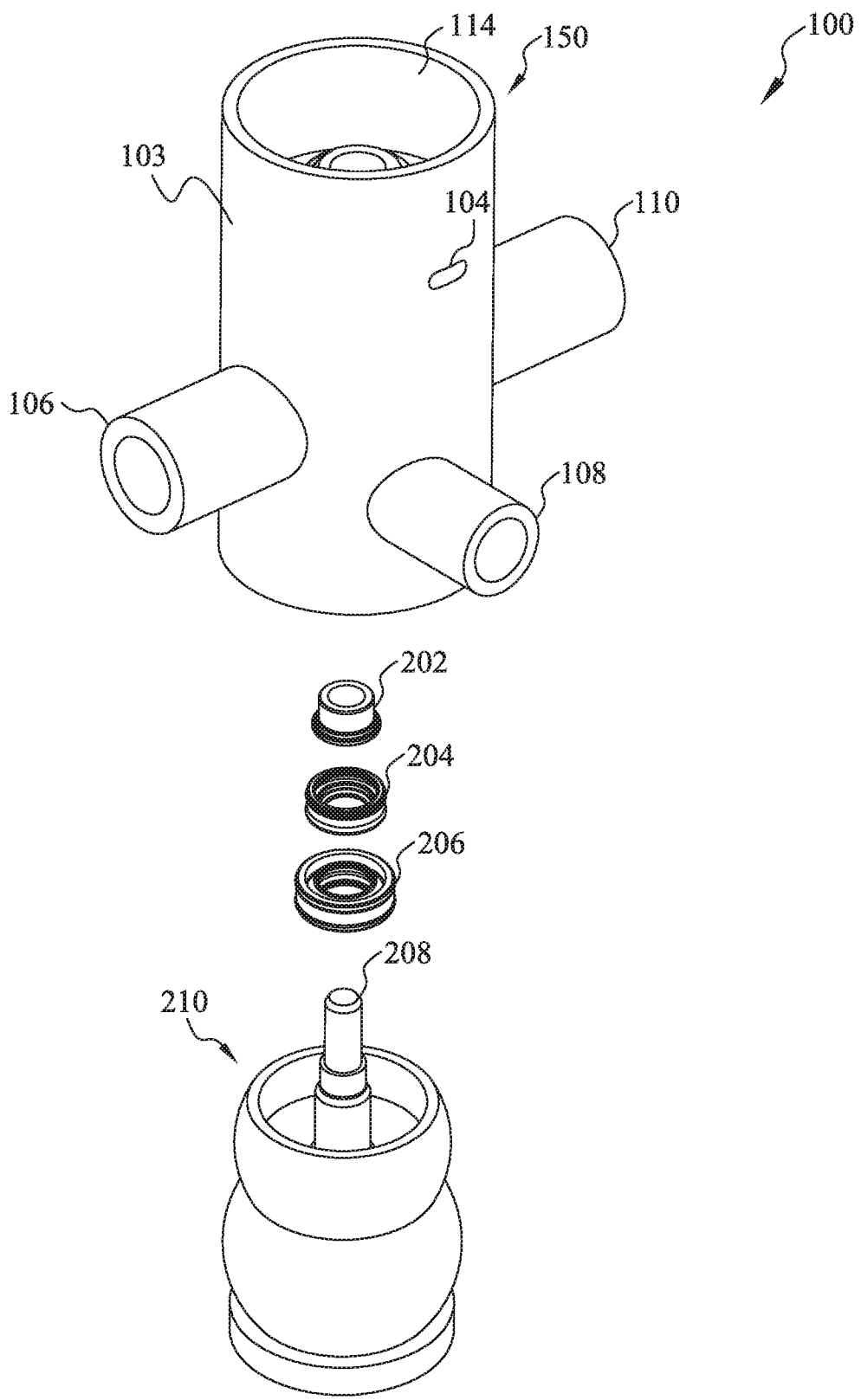
FIG. 2A is an exploded view of the vehicle thermostat in FIG. 1.
Figure 2B:
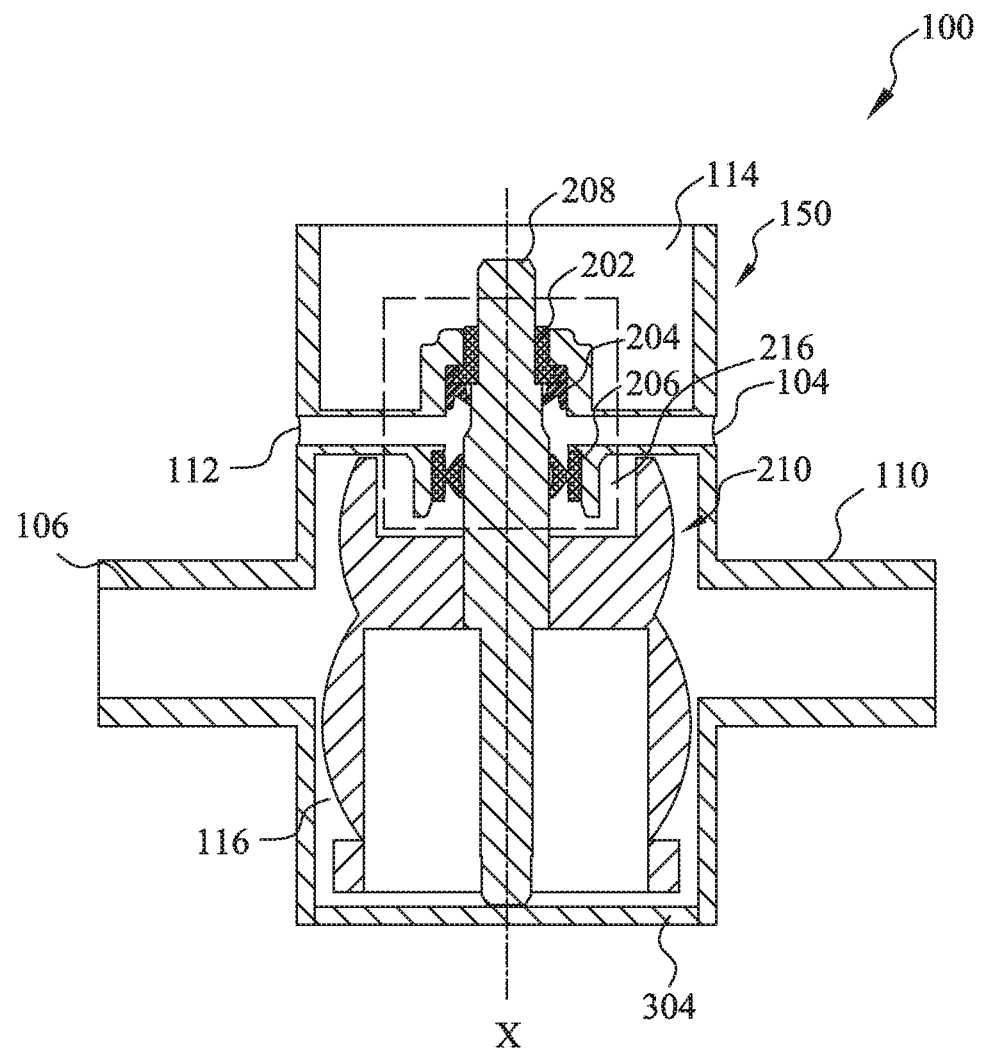
FIG. 2B is an axial sectional view of the vehicle thermostat in FIG. 1.

FIG. 1 is a stereogram of a vehicle thermostat 100 according to one embodiment of the present application; and FIG. 2A and FIG. 2B are an exploded view and an axial sectional view of the vehicle thermostat 100 in FIG. 1, respectively.

As shown in FIG. 1, FIG. 2A and FIG. 2B, the vehicle thermostat 100 includes a housing 150. The housing 150 comprises a housing body 103 and communicating pipes 106, 108 and 110. The housing body 103 is generally cylindrical and has an axis X. The communicating pipes 106, 108 and 110 are disposed on the housing body 103. Specifically, the communicating pipe 106 and the communicating pipe 110 are symmetrically disposed on the left side and right side of the housing 150 with respect to the housing body 103, respectively. The communicating pipe 108 is disposed on the front side of the housing body 103.

The vehicle thermostat 100 also includes a rotating shaft 208 and a hollow valve body 210 disposed in the housing 150. The rotating shaft 208 and the housing body 103 share the same axis X, and the rotating shaft 208 can rotate around the axis X. The hollow valve body 210 is connected to the rotating shaft 208. When the rotating shaft 208 rotates, the hollow valve body 210 can rotate together with the rotating shaft 208. The hollow valve body 210 is provided with two holes (not shown). By controlling the rotation of the valve body 210, the two holes can be controlled to align with two of the communicating pipes 106, 108 and 110, so that a cooling liquid can be selectively guided, by the vehicle thermostat 100, from an internal combustion engine via a bypass or radiator back to the internal combustion engine. The rotation of the valve body 210 is enabled by a driving device (not shown).

Referring to FIG. 2B, a partition board 112 is arranged in the housing 150. The partition board 112 is an annular plate arranged in the housing 150 and has an opening 125 through which the rotating shaft 208 passes (see also FIG. 3). The partition board 112 divides the space in the housing 150 into an upper chamber 114 and a lower chamber 116. The upper chamber 114 is configured to at least partially accommodate the driving device (not shown). The lower chamber 116 is configured to accommodate the valve body 210 (see FIG. 2B for details). After the hollow valve body 210 is installed in the lower chamber 116 of the housing 150, the rotating shaft 208 extends from the lower chamber 116 through the opening 125 of the partition board 112 into the upper chamber 114. In the upper chamber 114, the rotating shaft 208 is connected to the driving device. Since the lower chamber 116 contains the cooling liquid, a seal ring 204 and a seal ring 206 are provided between the partition board 112 and the rotating shaft 208 to prevent the cooling liquid from entering an area of a driving member located in the upper chamber 114 from the lower chamber 116.

Figure 3:
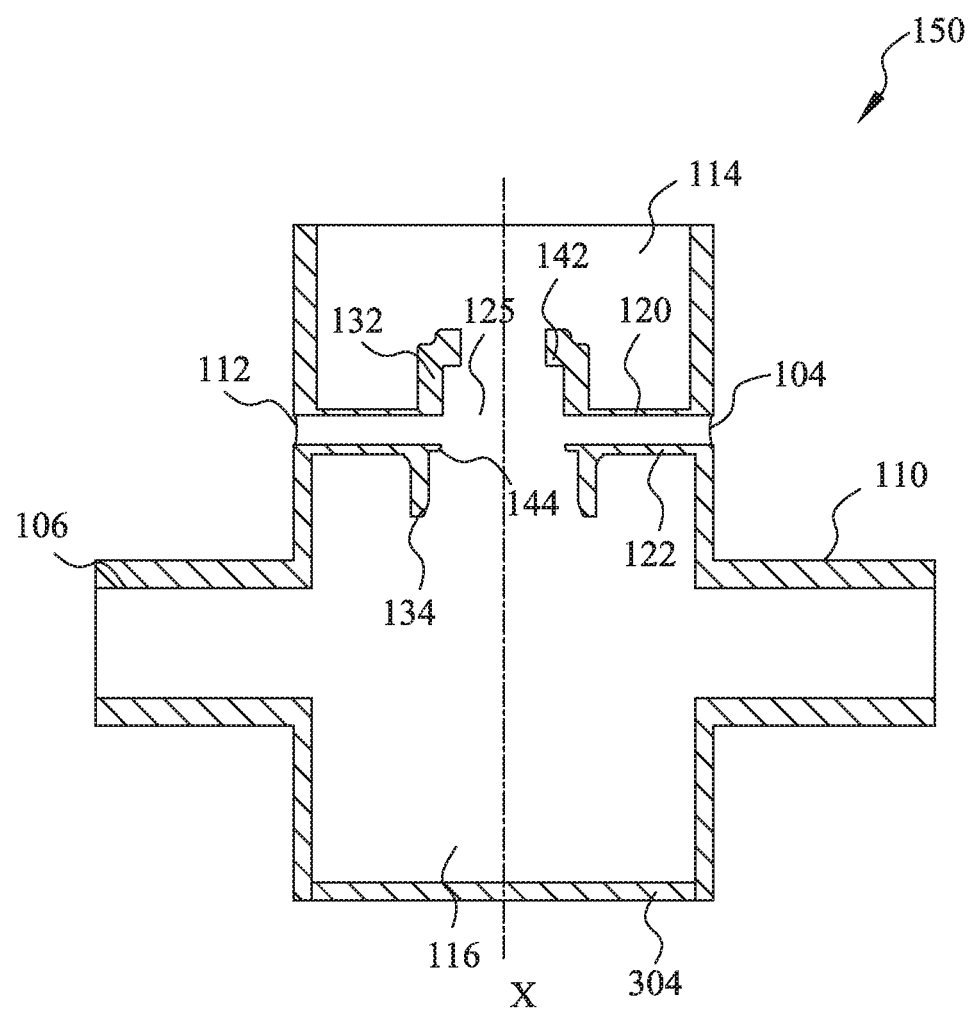
FIG. 3 is an axial sectional view of the housing in FIG. 1.

FIG. 3 is an axial sectional view of the housing 150 in FIG. 1. As shown in FIG. 3, the housing 150 is a cylinder with a closed lower part and an open upper part. Specifically, the lower part of the housing 150 may be closed by a closing plate 304. The bottom of the housing 150 may not be closed, but may be used as an inflow pipe or an outflow pipe. The partition board 112 includes an upper surface 120 and a lower surface 122. A passage 104 is provided in the partition board 112. The passage 104 extends through the partition board 112 and through the housing 150 and communicates with the atmosphere outside the housing 150, so that the cooling liquid potentially leaking from a seal structure 610 may not directly enter the upper chamber 114. The partition board 112 is provided with a supporting part 132 which is arranged around the opening 125 of the partition board 112 and extends upward from the upper surface 120 of the partition board 112. An upper end of the supporting part 132 is provided with a blocking part 142. A bearing 202 (as shown in FIG. 2B) is provided between the supporting part 132 and the rotating shaft 208, and the blocking part 142 may restrict the upward axial movement of the bearing 202. The seal ring 204 is installed between the supporting part 132 and the rotating shaft 208 (as shown in FIG. 2B). The partition board 112 is also provided with a supporting part 134, which is a cylinder formed by extending downward from the lower surface 122 of the partition board 112 at a distance from the opening 125. A blocking part 144 is formed on the portion between the supporting part 134 and the opening 125 of the partition board 112. The seal ring 206 is installed between the supporting part 134 and the rotating shaft 208 (as shown in FIG. 2B), and the blocking part 144 may restrict the upward axial movement of the seal ring 206 (as shown in FIG. 2B).

Figure 4:
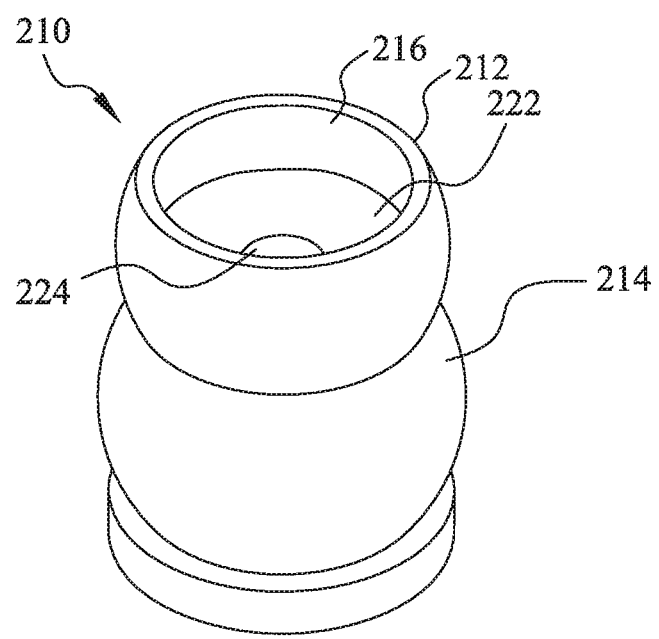
FIG. 4 is a stereogram of the valve body in FIG. 1.

FIG. 4 is a stereogram of the valve body 210 in FIG. 2A. As shown in FIG. 4, the valve body 210 includes an upper valve body 212 and a lower valve body 214, and the upper valve body 212 and the lower valve body 214 are in a partial spherical segment shape. The valve body 210 also includes a division board 222 disposed at the junction of the upper valve body 212 and the lower valve body 214, thereby dividing a cavity in the valve body 210 into an upper cavity 216 and a lower cavity 218 (not shown, see FIG. 7A to FIG. 7B for details). The division board 222 is provided with a hole 224 so that the rotating shaft 208 can pass through the division board 222. The upper cavity 216 is configured to accommodate the supporting part 134 and the seal ring 206 (as shown in FIG. 2B). The lower valve body 214 has the aforementioned hole (not shown) to fluidly communicate the valve body 210 with the lower chamber 116 in the housing 150. The rotating shaft 208 may or may not be integrally formed with the valve body 210, for example, by insert injection molding. Instead of including the two spherical portions as shown in FIG. 4, the valve body 210 may include only one spherical portion.

Figure 5A:
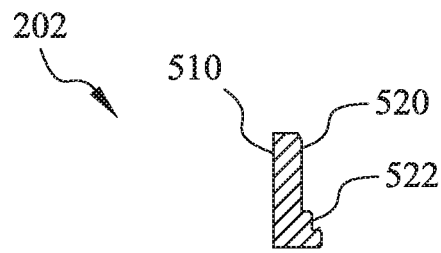
FIG. 5A is an axial sectional view of a bearing according to one embodiment of the present application.
Figure 5B:
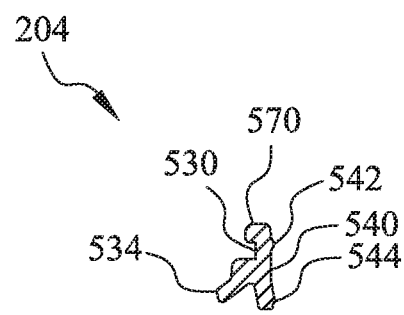
FIG. 5B is an axial sectional view of a seal ring according to one embodiment of the present application.

FIG. 5A and FIG. 5B are an axial sectional view of the bearing 202 and an axial sectional view of the seal ring 204 according to one embodiment of the present application, respectively. As shown in FIG. 5A, the bearing 202 has a hollow cylindrical shape with an inner wall 510 and an outer wall 520. The inner wall 510 is in contact with the rotating shaft 208. A lower end of the inner wall 510 is fitted with a stepped part 602 (see FIG. 6) on the rotating shaft 208 to restrict the bearing 202 from sliding down in an axial direction. A lower end of the outer wall 520 is provided with a protrusion 522.

Figure 6:
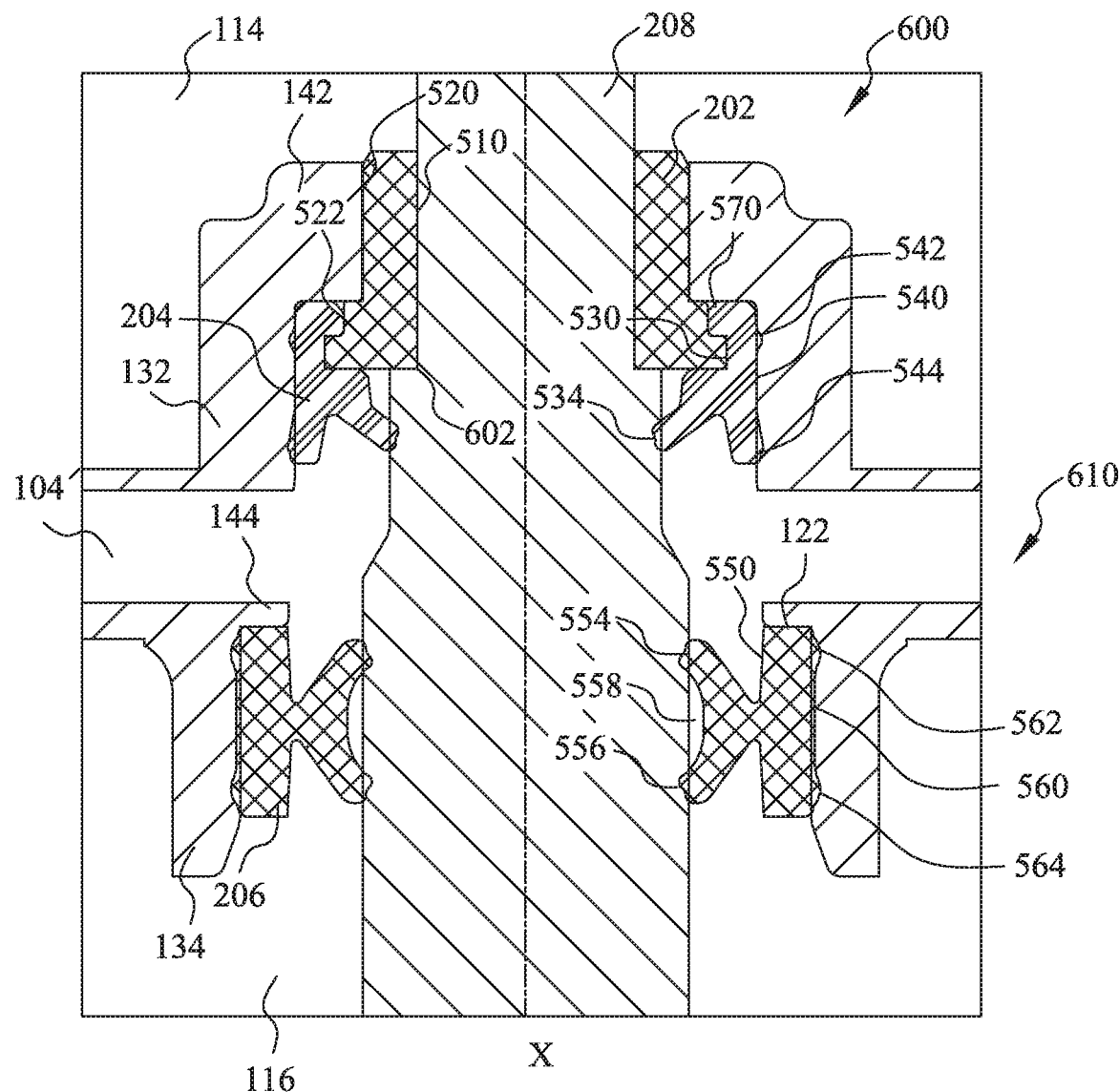
FIG. 6 is a partially enlarged view of FIG. 2B, showing a seal structure according to one embodiment of the present application.

As shown in FIG. 5B, the seal ring 204 has an outer wall 540 and an inner wall 530. The outer wall 540 includes external ribs 542 and 544, and the external ribs 542 and 544 are disposed along a circumferential direction of the outer wall 540. The inner wall 530 includes a seal contact part 534 extending inwards from the inner wall 530, the seal contact part 534 is disposed along a circumferential direction of the inner wall 530, and the seal contact part 534 extends obliquely downwards from the inner wall 530 so that an axial section of the seal ring 204 is a Y-shaped structure. A hook component 570 is provided at an upper end of the seal ring 204, and the hook component 570 is disposed along a circumferential direction of the inner wall 530. The hook component 570 can be engaged with the protrusion 522 of the bearing 202, thereby engaging the seal ring 204 with the bearing 202 (as shown in FIG. 6). In this way, the seal ring 204 may be prevented from sliding downwards along an axial direction by the bearing 202.

It should be noted that the bearing 202 and the seal ring 204 may have various configurations. As an example, the outer wall 540 may include one or more external ribs, and the external ribs are disposed along a circumferential direction of the outer wall 540. As another example, the inner wall 530 may include one or more seal contact parts extending inwards from the inner wall 530, and the seal contact parts are disposed along a circumferential direction of the inner wall 530.

Figure 5C:
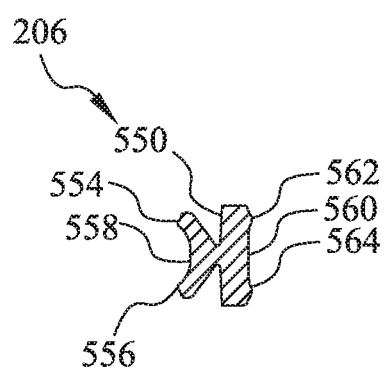
FIG. 5C is an axial sectional view of a seal ring according to one embodiment of the present application.

FIG. 5C is an axial sectional view of the seal ring 206 according to one embodiment of the present application. As shown in FIG. 5C, the seal ring 206 has an outer wall 560 and an inner wall 550. The outer wall 560 includes external ribs 562 and 564, and the external ribs 562 and 564 are disposed along a circumferential direction of the outer wall 560. The inner wall 550 includes seal contact parts 554 and 556 extending inwards from the inner wall 550, and the seal contact parts 554 and 556 are disposed along a circumferential direction of the inner wall 550, wherein one seal contact part 554 extends obliquely upwards from the inner wall 550, and the other seal contact part 556 extends obliquely downwards from the inner wall 550 so that an axial section of the seal ring 206 is a K-shaped structure. A recessed part 558 is provided between the two seal contact parts 554 and 556, and the recessed part 558 may be configured to receive a lubricant.

It should be noted that the outer wall 560 may also have more different configurations. As an example, the outer wall 560 may include one or more external ribs, and the external ribs are disposed along a circumferential direction of the outer wall 560. As another example, the inner wall 550 may include even more seal contact parts extending inwards from the inner wall 550, and the seal contact parts are disposed along a circumferential direction of the inner wall 550.

The seal ring 204 and the seal ring 206 in the application are made of an elastic material. For example, the elastic material is ethylene propylene diene rubber. In order to realize mass production at low cost, the seal rings 204 and 206 may be injection molded.

FIG. 6 is a partially enlarged view of the dashed line portion in FIG. 2B, showing seal structures 600 and 610 according to one embodiment of the application. As shown in FIG. 6, the seal structure 600 is configured to form a seal between the rotating shaft 208 and the housing 150 to prevent the cooling liquid from entering an area of the driving member located in the upper chamber 114 from the lower chamber 116 and to prevent gas from entering the area of the driving member located in the upper chamber 114 from the gas passage 104 of the partition board 112 of the housing 150. The seal structure 600 includes the seal ring 204 and a structure mating with the seal ring 204. Specifically, the inner wall 510 of the bearing 202 abuts against the rotating shaft 208, an inner side of a lower end of the bearing 202 is engaged with the stepped part 602 on the rotating shaft 208, and the outer wall 520 of the bearing 202 abuts against the blocking part 142 of the housing 150. The axial and radial movements of the bearing 202 are restricted by the above-described engagement, so that the bearing 202 is limited between the rotating shaft 208 and the blocking part 142 of the housing 150. The seal ring 204 is sandwiched between the bearing 202 and the supporting part 132 of the housing 150 so that the external ribs 542 and 544 on the outer wall 540 of the seal ring 204 abut against the supporting part 132, and the seal contact part 534 of the seal ring 204 abuts against the rotating shaft 208, and thus the seal ring 204 cannot move radially. The hook component 570 of the seal ring 204 is engaged with the protrusion 522 of the bearing 202, thereby restricting the seal ring 204 from sliding down in the axial direction. As a result, there is no liquid passage between the rotating shaft 208 and the partition board 112 of the housing 150 anymore, thereby enabling the sealed separation of the upper chamber 114 from the passage 104.

When the seal ring 204 is installed in the assembly position shown in FIG. 6, since the seal ring 204 is made of an elastic material, the external ribs 542 and 544 are squeezed and deformed to generate friction, and so is the seal contact part 534. Since the friction force on the seal contact part 534 is smaller than the friction force on the external ribs 542 and 544, when the rotating shaft 208 in the vehicle thermostat 100 rotates, the seal ring 204 may not rotate along with the rotating shaft 208.

The bearing 202, the seal ring 204 and the rotating shaft 208 may be assembled in the following order: first, engaging the seal ring 204 with the bearing 202, followed by mounting them to the housing 150, and then inserting the rotating shaft 208. However, for the seal ring 204 in the application, the seal ring 204 may also first be engaged with the bearing 202, and then sleeved onto the rotating shaft 208, and then the assembled seal ring 204 may be installed into the housing 150, which more advantageously enables mass automatic assembly.

Next, the seal structure 610 will be described. As shown in FIG. 6, the seal structure 610 is also configured to form a seal between the rotating shaft 208 and the housing 105 to prevent the cooling liquid in the valve body 210 from entering the gas passage 104 of the housing 105 and keep gas from entering the valve body 210 from the gas passage 104, and further stop the cooling liquid from entering the area of the driving member located in the upper chamber 114 from the lower chamber 116. The seal structure 610 includes the seal ring 206 and a structure mating with the seal ring 206. Specifically, the seal contact parts 554 and 556 on the inner wall 550 of the seal ring 206 abut against the rotating shaft 208, and the external ribs 562 and 564 on the outer wall 560 of the seal ring 206 abut against the supporting part 134 to restrict the radial movement of the seal ring 206. An upper end of the seal ring 206 abuts against the blocking part 144 of the housing 150, thereby limiting the seal ring 206 between the rotating shaft 208 and the supporting part 134 of the housing 150. In this way, there is no fluid passage between the rotating shaft 208 and the housing 150 anymore due to the presence of the seal ring 206, thus enabling the seal between the rotating shaft 208 and the housing 150.

Like the seal ring 204, the seal ring 206 is also made of an elastic material, so when the seal ring 206 is installed in the assembly position as shown in FIG. 6, the external ribs 562 and 564 are squeezed and deformed to generate friction, and so are the seal contact parts 554 and 556. Since the friction force on the seal contact parts 554 and 556 is smaller than the friction force on the external ribs 562 and 564, the seal ring 206 may not rotate along with the rotating shaft 208 when the rotating shaft 208 in the vehicle thermostat 100 rotates. As an example, as described above, the axial section of the seal ring 206 is configured to be a K-shaped structure such that the recessed part 558 is provided between the two seal contact parts 554 and 556, and the recessed part 558 is configured to receive a lubricant, thereby lubricating the rotating shaft 208.

Similar to the seal ring 204, the seal ring 206 and the rotating shaft 208 may be assembled in the following order: first, engaging the seal ring 204 with the bearing 202, followed by mounting them to the housing 150, and then inserting the rotating shaft 208. However, for the seal ring 204 in the application, the seal ring 204 may also first be engaged with the bearing 202, and then sleeved onto the rotating shaft 208, and then the assembled seal ring 204 may be installed into the housing 150, which more advantageously enables mass automatic assembly.

Figure 7A:
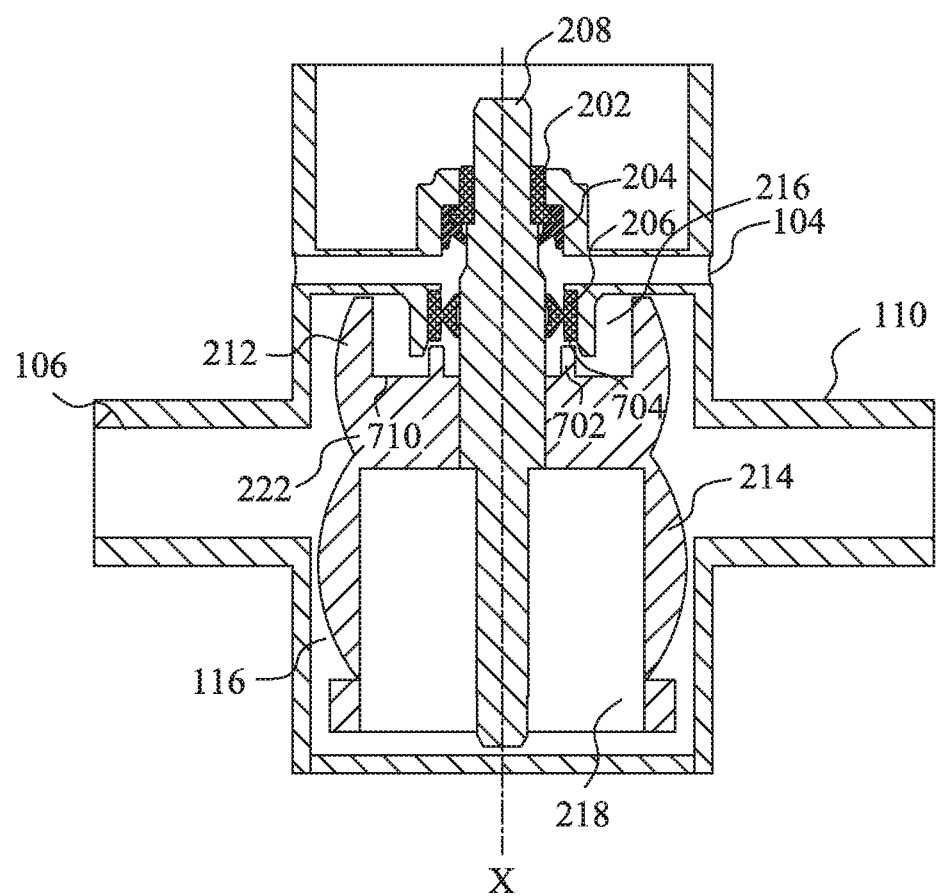
FIG. 7A is an axial sectional view of a vehicle thermostat according to another embodiment of the present application, showing a seal structure having adjustment contact parts.

FIG. 7A is an axial sectional view of a vehicle thermostat 100 according to another embodiment of the present application, showing a seal structure having adjustment contact parts. As shown in FIG. 7A, a top surface 710 of the division board 222 of the valve body 210 (i.e., the bottom of the cavity 216) is provided with the adjustment contact part 702 so that the seal ring 206 contacts the adjustment contact part 702 when sliding down the rotating shaft 208, so as to be supported. As one embodiment, the adjustment contact part 702 protrudes from the bottom of the cavity 216 of the valve body 210 (i.e., the top surface 710 of the division board 222), and an adjustment space 704 is provided between a top portion of the adjustment contact part 702 and a lower portion of the seal ring 206.

Figure 7B:
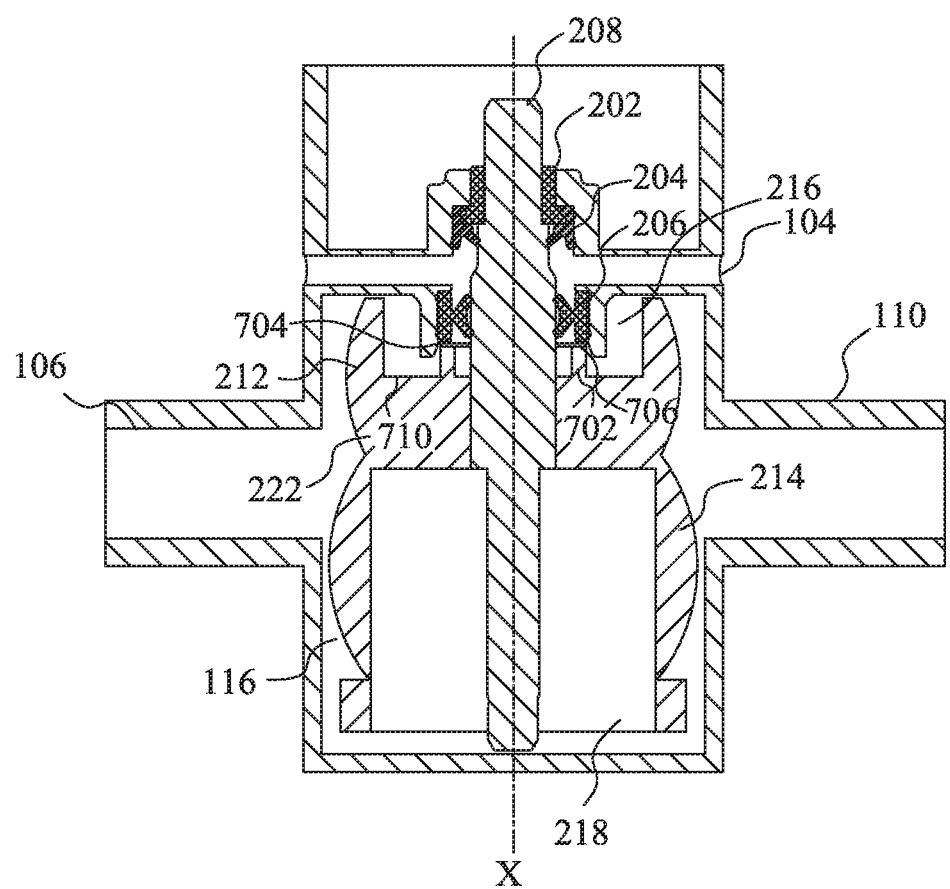
FIG. 7B is an axial sectional view of a vehicle thermostat according to yet another embodiment of the present application, with an additional gasket on the basis of FIG. 7A.

FIG. 7B is an axial sectional view of a vehicle thermostat 100 according to yet another embodiment of the present application, with an additional gasket 706 on the basis of FIG. 7A. As shown in FIG. 7B, the adjustment contact part 702 includes several arms protruding from the bottom of the cavity 216 of the valve body 210 (i.e., the top surface 710 of the division board 222). The gasket 706 is provided between the adjustment contact part 702 and the seal ring 206, so that the seal ring 206 may be better supported when sliding down the rotating shaft 208.

Although only some features of the application have been illustrated and described herein, many modifications and variations will occur to those skilled in the art. It is therefore to be understood that the appended claims are intended to cover all such modifications and variations as fall within the true spirit of the application.

I claim:
1. A seal structure ring comprising:
a housing comprising a partition board;

a first seal ring having an outer wall and an inner wall, wherein the outer wall includes one or more external ribs, the external ribs being disposed along a circumferential direction of the outer wall, wherein the inner wall includes one or more seal contact parts extending inwards from the inner wall, the seal contact parts being disposed along a circumferential direction of the inner wall;

a supporting part extending downward from a lower surface of the partition board, wherein the first seal ring abuts against the supporting part;

a second seal ring positioned above the first seal ring;

a valve body, a downwardly recessed cavity being provided at a top portion of the valve body; and a rotating shaft extending through an opening of the partition board and passing through the cavity, the first seal ring and the second seal ring abutting against the rotating shaft, wherein an adjustment contact part is provided at a bottom portion of the cavity of the valve body, and an adjustment space is provided between the adjustment contact part and a lower portion of the first seal ring.

2. The seal structure according to claim 1, wherein the first seal ring includes two seal contact parts, wherein one of the seal contact parts extends obliquely upwards from the inner wall, and the other of the seal contact parts extends obliquely downwards from the inner wall.

3. The seal structure according to claim 2, wherein an axial section of the first seal ring is a K-shaped structure, and a recessed part is provided between the two seal contact parts, the recessed part being configured to receive a lubricant.

4. The seal structure according to claim 1, wherein the second seal ring includes one seal contact part, wherein the seal contact part of the second seal ring extends obliquely downwards from an inner wall of the second seal ring so that an axial section of the second seal ring is a Y-shaped structure, and wherein a hook component is provided at an upper end of the second seal ring, the hook component being disposed along a circumferential direction of the inner wall of the second seal ring for restricting the second seal ring from sliding downwards along an axial direction.

5. The seal structure according to claim 1, wherein the first seal ring is made of an elastic material, and wherein the elastic material is ethylene propylene diene rubber.

6. The seal structure according to claim 1, wherein the first seal ring is injection molded.

7. A seal structure, comprising:
a housing comprising a partition board;
a seal ring having an outer wall and an inner wall, wherein the outer wall includes one or more external ribs, the external ribs being disposed along a circumferential direction of the outer wall, and wherein the inner wall includes one or more seal contact parts extending inwards from the inner wall, the seal contact parts being disposed along a circumferential direction of the inner wall;
a supporting part extending downward from a lower surface of the partition board;
a valve body, a downwardly recessed cavity being provided at a top portion of the valve body; and
a rotating shaft extending through an opening of the partition board and, passing through the cavity, the seal ring being disposed between the supporting part and the rotating shaft, wherein an adjustment contact part is provided at a bottom portion of the cavity of the valve body, and an adjustment space is provided between the adjustment contact part and a lower portion of the seal ring, wherein an outer diameter of the adjustment contact part is smaller than an inner diameter of the supporting part, and wherein the seal ring is made of an elastic material.

8. The seal structure according to claim 7, wherein the adjustment contact part protrudes from the bottom portion of the cavity of the valve body.

9. The seal structure of claim 7, wherein the seal ring includes two seal contact parts, wherein one of the seal contact parts extends obliquely upwards from the inner wall, and the other of the seal contact parts extends obliquely downwards from the inner wall.

10. The seal structure of claim 7, wherein the elastic material is ethylene propylene diene rubber.

11. A thermostat, comprising:
a housing;
a partition board arranged in the housing, wherein the partition board divides a space in the housing into an upper chamber and a lower chamber, and wherein a passage extends through the partition board and through the housing;
a supporting part extending downward from a lower surface of the partition board;
a valve body disposed in the lower chamber of the housing, a downwardly recessed cavity being provided at a top portion of the valve body;
a rotating shaft extending through an opening of the partition board and passing through the cavity;
a first seal structure positioned between the supporting part and the rotating shaft; and
a second seal structure positioned above the first seal structure and abutting against the rotating shaft, wherein an adjustment contact part is provided at a bottom portion of the cavity of the valve body, and an adjustment space is provided between the adjustment contact part and a lower portion of the first seal structure.

12. The thermostat of claim 11, wherein an outer diameter of the adjustment contact part is smaller than an inner diameter of the supporting part.

13. The thermostat of claim 11, wherein the first seal structure comprises a first seal ring having an outer wall and an inner wall, and wherein the outer wall includes one or more external ribs, the external ribs being disposed along a circumferential direction of the outer wall.

14. The thermostat of claim 13, wherein the inner wall includes one or more seal contact parts extending inwards from the inner wall, the seal contact parts being disposed along a circumferential direction of the inner wall.

15. The thermostat of claim 11, wherein the second seal structure comprises a second seal ring, and wherein a hook component is provided at an upper end of the second seal ring.

16. The thermostat of claim 15, wherein the second seal structure further comprises a bearing disposed on the rotating shaft, and wherein a protrusion is provided at a lower end of the bearing.

17. The thermostat of claim 16, wherein the protrusion is configured for being engaged with the hook component to restrict the second seal ring from sliding downwards along an axial direction.

18. The thermostat of claim 11, wherein the adjustment contact part protrudes from the bottom portion of the cavity of the valve body.

19. The thermostat of claim 11, wherein the supporting part extends into the cavity of the valve body.

\* \* \* \* \*